United States Patent
Mun et al.

(10) Patent No.: US 7,545,314 B2
(45) Date of Patent: Jun. 9, 2009

(54) UWB SIGNAL TRANSMITTER FOR RADARS AND SENSORS

(75) Inventors: Wang-Jin Mun, Seoul (KR); Han-Seok Lee, Gyeonggi-do (KR); Krylov S. Konstantin, Moscow (RU); Fedotov Dmitry, Moscow (RU); Alexander A. Sudakov, Moscow (RU); Mityaev Evgeny, Moscow (RU); Koroloev S. Vladimir, Moscow (RU)

(73) Assignee: S1 Corporation (KR)

( * ) Notice: Subject to any disclaimer, the term of this patent is extended or adjusted under 35 U.S.C. 154(b) by 0 days.

(21) Appl. No.: 12/014,517

(22) Filed: Jan. 15, 2008

(65) Prior Publication Data
US 2008/0174471 A1    Jul. 24, 2008

(30) Foreign Application Priority Data
Jan. 16, 2007    (RU) ............................... 2007101081

(51) Int. Cl.
*G01S 13/00*    (2006.01)

(52) U.S. Cl. ..................................................... 342/175
(58) Field of Classification Search .................. 342/21, 342/28, 70
See application file for complete search history.

(56) References Cited

U.S. PATENT DOCUMENTS

2007/0194978 A1* 8/2007 Teshirogi et al. .............. 342/70

OTHER PUBLICATIONS

Garg, R., et al., "Microstrip antenna design handbook", *Artech house, Inc*, (2001), 253.

* cited by examiner

*Primary Examiner*—Dan Pihulic
(74) *Attorney, Agent, or Firm*—Schwegman, Lundgerg & Woessner, P.A.

(57) ABSTRACT

The present invention relates to a UWB radio transmission module including a UWB signal generation circuit. The UWB signal generation circuit controls the power consumption outputs according to a power supply opening/closing mode, and is connected to a common resonator and a feedback circuit type of UWB signal output device.

18 Claims, 5 Drawing Sheets

UWB SIGNAL TRANSMITTER FOR RADARS AND SENSORS

BACKGROUND OF THE INVENTION (a) Field of the Invention

The present invention relates to an ultra-wideband (UWB) device design. More particularly, the present invention relates to a method for a local UWB radar system to generate ultra-wideband signals and design radiation drawings, the system being used for a security system for detecting an intrusion into a protection area.

(b) Description of the Related Art

In general, the important block of a radar type of device is a radio frequency (RF) unit in a like principle in which an ultrasonic wave output unit and a control wiring unit are important parts of an ultrasonic wave device and an infrared receiver and a control wiring unit are important parts of an infrared device. The RF unit includes an RF transmitter, a receiver, and a control device.

FIG. 1 shows a circuit diagram of a general radio signal transmitter. An operational characteristic of an ultra wideband frequency bandwidth is that the conventional format that does not use an output amplifier can be changed a little. For example, the documents disclosed in the Pulstech and Intel web sites may describe features of an output amplifier.

The transmitter characteristics determine important specifications of equipment such as the distance, safety for interference, intrusion performance, complexity, and price. For example, a frequency infrared band sensor is used to guard spaces in various buildings. The sensor is inexpensive but generates frequent false alarms because moving air flows at different temperatures in a guard area. RF components of microwave sensors at major roads are expensive. The greater the frequency is, the greater the price is. The microwave sensor has large input power.

The large input power is a characteristic of the ultra-wideband RF circuit. A method for solving the problem is to use a method for controlling RF module power appropriate for the UWB.

Various attempts for increasing the frequency in the used RF constituent elements are known. Particularly, one solution is Russian Patent No. 2188500 [3] for complementing the radar structure with a wave guide filled with a predetermined gas and a laser resource. In the case of outputting the laser, part of the gas is changed into plasma. The wavelength of the VHF range is divided to the plasma part while passing through the pipe, which generates VHF beam pulses with a length that is less than 10 ms. The above-noted solution is complex and expensive and hence its application range is very limited.

U.S. Pat. No. 5,889,497 [4] discloses an ultra-wideband output device, in which a pulse generator is connected to two horn antennas having different insulation characteristics and the beam pulse has a pulse generation speed with a range of 200 ps. The solution is generally used for a high-pressure device, which generates a bad influence on the degree and price of device elements.

U.S. Pat. No. 6,100,839 [5] discloses an improved pulse radar system, system for combining the functions of respective constituent elements so as to reduce the price and size of the system. Respective elements of an antenna array are proposed to be used as transmit antennas and receive antennas, and one ADC is used. However, this method fails to notice the fact in which the Q factor of the antenna is reduced in proportion to the enlargement of the operational frequency bandwidth. Therefore, the ultra-wideband sensor requires an ultra-wideband antenna having a great Q factor so as to guarantee the function of a signal generation circuit resonator. However the antenna used in [5] does not have the above-noted characteristics.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to generate an ultra-wideband RF transmission module with less power consumption, small size, and low price.

The technical object is solved by developing an ultra wideband RF module having an ultra-wideband signal generation circuit in the embodiment of the present invention, and a UWB signal generation circuit controls power consumption according to a power opening/closing mode, and is connected to a common resonator and a feedback circuit type UWB signal output device.

The technical results are achieved by combining one assemble unit with an RF transmission module and a UWB unit of the UWB signal generation circuit, thereby substantially reducing the radar circuit. In this instance, a power opening/closing and control device for allowing very much less power consumption is installed in a UWB wireless transmission module when no signal is generated.

Regarding the UWB signal output device, an antenna in the square microband resonator format realized by considering an air insulation substrate is generally used and known. The microband antennas and the variety of calculations thereof are widely described in the prior art (e.g., refer to "Microstrip Antenna Design Handbook" by Ramesh Garg, Prakash Bhartia, Inder Bahl, issued by Artech House, INC., 2001, p253 [6]) Since it is needed to manufacture the antenna with less energy consumption, the power supply control principle (strobing) is applied to the equipment. Any device can reduce power consumption by performing power strobing or controlling since the equipment is not always operable but is operable when the power supply can be strobed or the control function thereof is performed. Strobing or control of the power supply is used so as to reduce the power consumption of the unit that has the greatest energy consumption in the general equipment. In the case of the present invention, the ultra-wideband signal generation and configuration circuits are supply-power-strobed or controlled. For example, the structure that is realized based on the present invention has power consumption of 60 mW without the above-noted function and it has power consumption of 5 mW when the strobing is used. The strobing principle is widely applied to systems operable in the UWB range, referring to Russian Application No 2002108117 [7] and Russian Patent No 2233543 [8].

Therefore, according to the present invention, the ultra-wideband RF transmission module for a radar or a sensor with less power consumption, small size, and low price can be provided.

DETAILED DESCRIPTION OF THE EMBODIMENTS

The present invention relates to an ultra-wideband signal output region, wherein the essential configuration part in the wideband viewpoint of the entire RF transmission module is the output unit (i.e., antenna), and the frequency characteristic (wideband) of the antenna determines the final parameter of the RF transmission module.

Drawings will be used so as to clarify the present invention.

Figure 1:
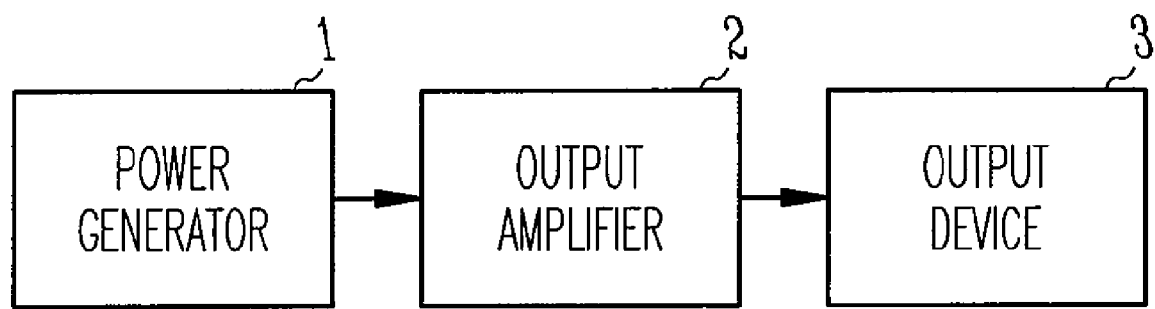
FIG. 1 is a block diagram of a general radio signal generation circuit.

FIG. 1 is a block diagram of a general RF signal generation circuit for generating, amplifying, and outputting RF signals, including a power generator 1, an output amplifier 2, and an output device 3 (i.e., a transmit antenna).

Figure 2:
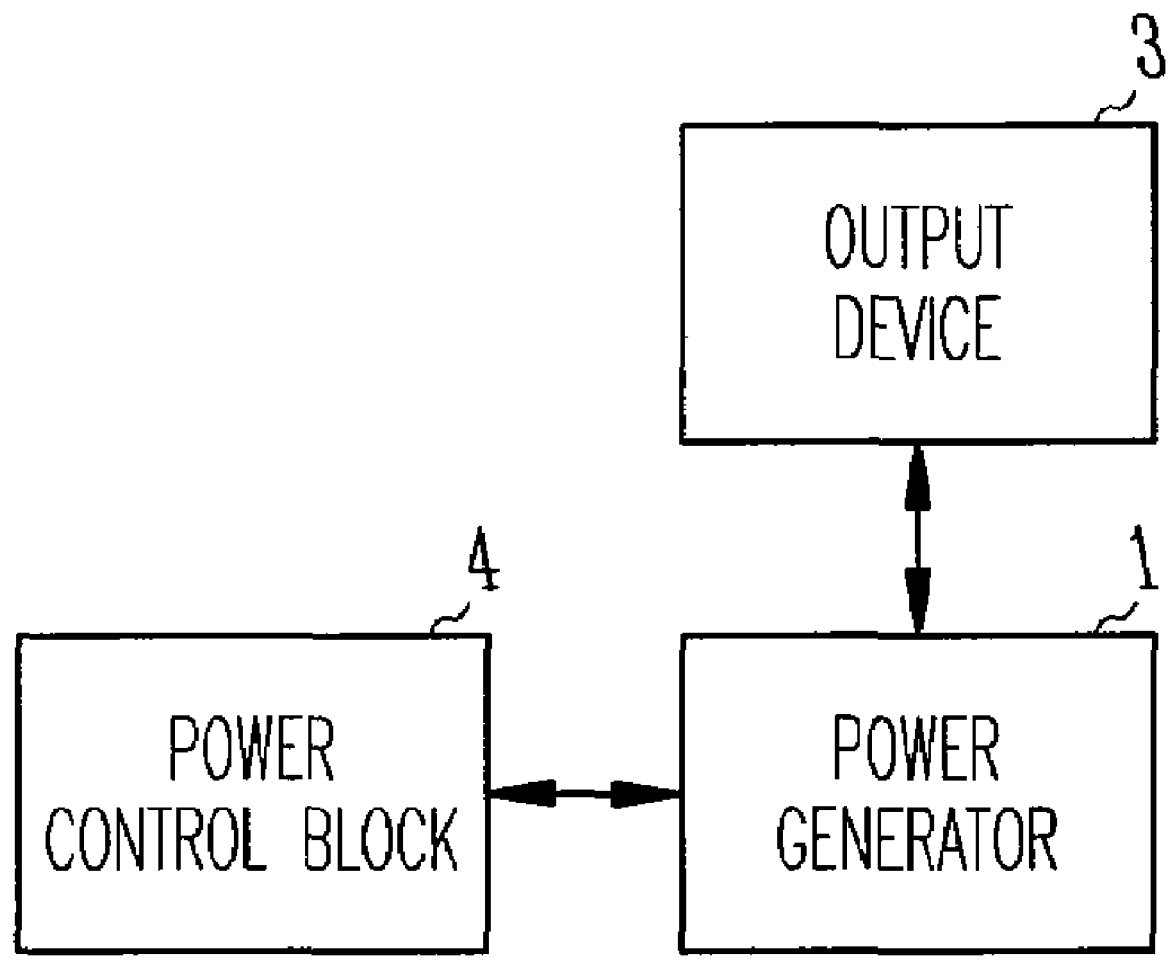
FIG. 2 is a block diagram of a transmitter.

FIG. 2 is a block diagram of a transmitter configuring a UWB signal generation circuit for controlling the power connected to the UWB signal output device (i.e., a transmit antenna), and includes a power generator 1, an output device 3 (i.e., a transmit antenna), and a power control block 4.

Figure 3:
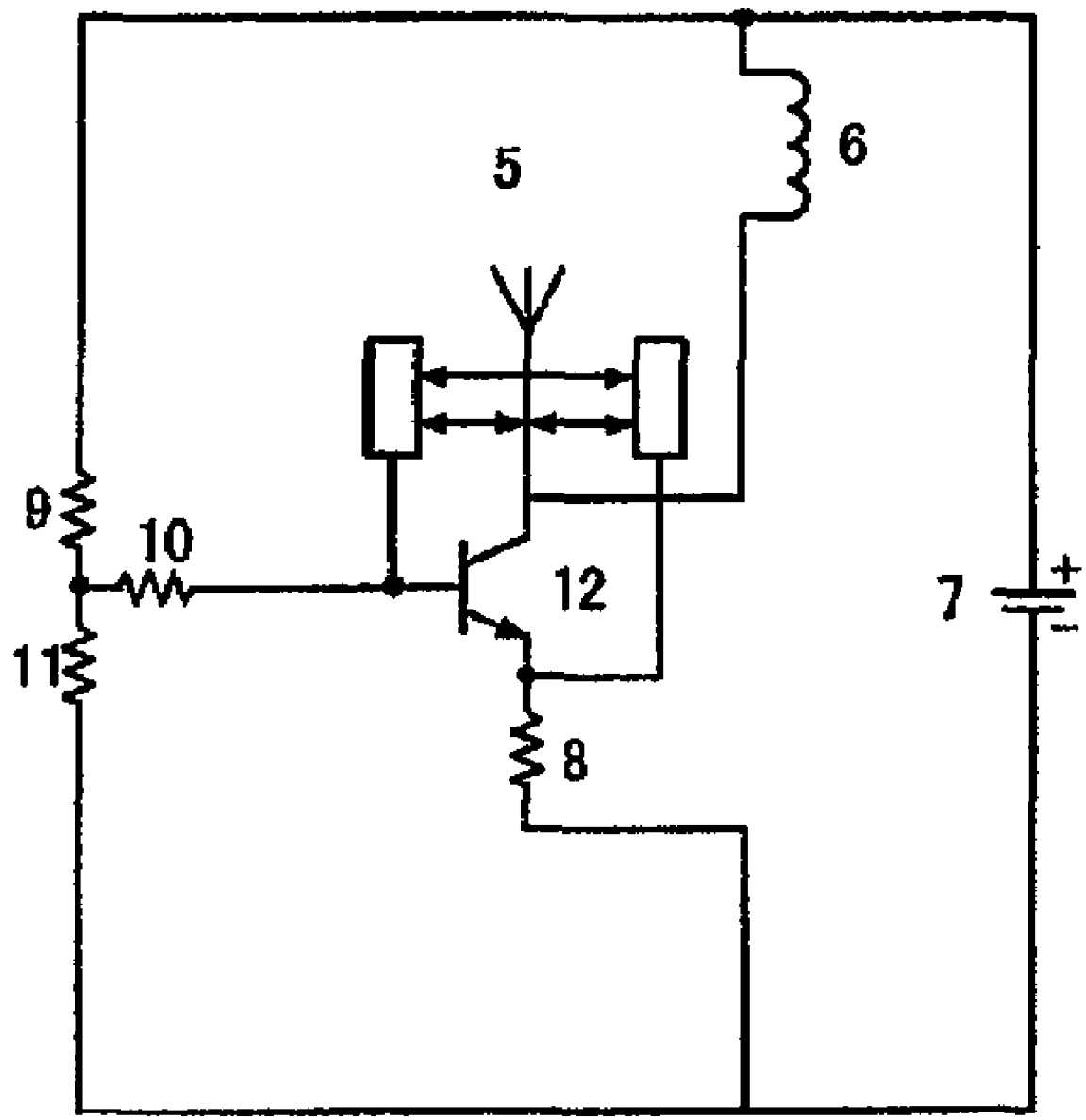
FIG. 3 is a principle circuit diagram of a UWB signal generator.

FIG. 3 is a principle circuit of the UWB signal power generator that is configured with a frequency designation circuit component connected to a principle cavity of a power generator, a feedback circuit of an active component, and a UWB output device, and includes a common resonator 5, a power filter 6, a power supply device 7, a current point resistor 8, resistor dividers 9 to 11, and an active component 12 of a bipolar logic device. In this instance, the common resonator 5 is a UWB signal transmitting antenna type output device connected to a microstrip.

Figure 4:
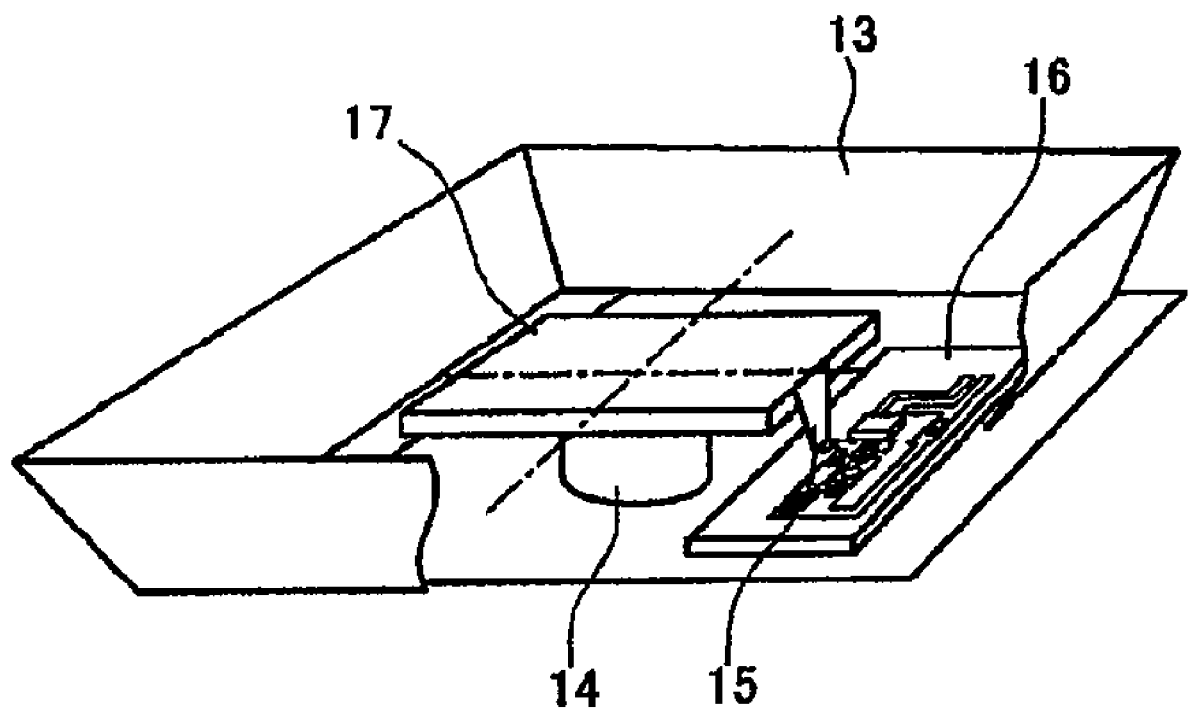
FIG. 4 is a schematic diagram of a power generation module.

FIG. 4 is a configuration diagram of the power generation module, and includes a reflector 13, a mobile insulation box 14, a power cable 15 of a resonance antenna component, a PCB 16, and a resonance antenna component 17.

The reflector 13 has a conductive quadrangular pyramid form with its top part being cut to be open. The mobile insulation box 14 is provided in the center of the reflector and mechanically fixes the resonance antenna component 17 on the flat part of the reflector. The conductive power cable 15 of the resonance antenna component 17 combines the PCB 16 and the resonance antenna component 17. The PCB 16 is the PCB of the UWB signal generation circuit (power generator). The resonance antenna component 17 has a micro strip block format.

Figure 5:
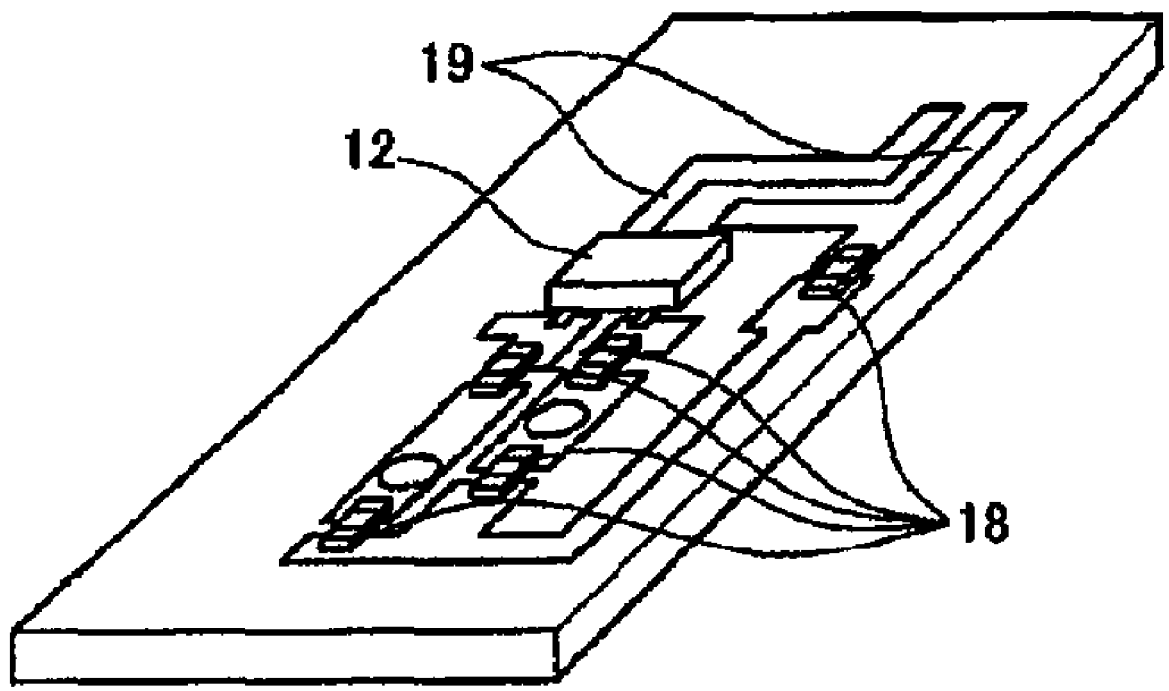
FIG. 5 is a PCB schematic diagram of a UWB signal generation circuit.

FIG. 5 is a PCB configuration diagram of the UWB signal generation circuit (power generator) and includes an active component 12, a power and active component replacement circuit 18, and a combined microstrip resonator 19.

The general configuration of the UWB generation module (power generator) is shown in FIG. 2.

The UWB generation module includes a UWB signal generation circuit, that is, it includes a UWB signal generator for controlling power supply by using a power control circuit operable by a predetermined algorithm, and a UWB signal output device. In the solution, the UWB signal output device is realized in the quadrangular microstrip resonator format having an air insulation substrate.

A general circuit diagram of the power generation module is shown in FIG. 3. A DC active component operation mode is determined by the resistor dividers 9, 10, and 11 and the resistor 8.

The power filter 6 filters the VHF signal. In the UWB output mode, the operation mode and the characteristics of the VHF generation module are determined by a parameter of the microstrip line of the output device circuit of the substrate and active component 12, coupling between circuits, a parameter of the output device, and a communication value between the output device and the micro strip line. The parameters are related with each other and detailed requirements on the power generator module are determined by the above-described configuration.

A important component of the entire generator module for determining the coupling between the elements of the common resonator 5 and influencing the frequency bandwidth output by the UWB mode is the UWB signal output device (antenna). The basis of the present development is the microstrip antenna in the quadrangular resonator format having an air insulation substrate. A basic component of the antenna for the present device is the quadrangular microstrip component 17 shown in FIG. 4. The microstrip component 17 is installed on the PCB 16 of the power generator with the help of the insulation box 14, and the microstrip component 17 is combined with the substrate 16 with the help of the strip.

The horn configuration is formed by installing a protection device 13 near the microstrip resonance component of the antenna. The microstrip resonance component is made of a conductor material and has the quadrangular pyramid form with its top being cut to be open.

The PCB arrangement diagram of the power generator is shown in FIG. 5, and it includes a microstrip resonator 19, an active component (12, a bipolar element), and a power and active component replacement circuit 18.

The present invention is applicable to the UWB fields that require the greatest convenience, the minimum dimensions, and the lowest transmission cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An ultra wide band (UWB) radio transmission module comprising:
   a UWB signal generation circuit, wherein the UWB signal generation circuit is to control power consumption outputs through a power supply opening/closing mode and is connected with a common resonator and a feedback circuit of UWB signal output device;
   wherein the UWB signal generation circuit comprises a power generator module, the power generator module comprises:
   a conductor material;
   a reflector having a conductive quadrangular pyramid form with its top part being open;
   a mobile insulation box provided in the center of the reflector and mechanically fixing the resonance antenna component on a flat part of the reflector;
   a power cable of a conductor type of resonator antenna component for combining a PCB and the resonator antenna component;
   a PCB of the UWB signal generation circuit; and
   a microstrip resonance antenna component.

2. The UWB radio transmission module of claim 1, wherein the microstrip resonance antenna component includes a quadrangular micro strip resonator-type antenna.

3. The UWB radio transmission module of claim 2, wherein the quadrangular micro strip resonator-type antenna includes an air insulation substrate.

4. The UWB radio transmission module of claim 3, wherein the UWB signal generation circuit reduces power consumption to 5 mW.

5. The UWB radio transmission module of claim 3, wherein the feedback circuit comprises a filter and a resistor network and produces a signal to control the opening/closing mode.

6. The UWB radio transmission module of claim 5, wherein the UWB signal generation circuit comprises an active switch including a control connected to the resistor network.

7. The UWB radio transmission module of claim 6, wherein the active switch includes an emitter connected to ground and a collector connected to the antenna component.

8. The UWB radio transmission module of claim 6, wherein the resistor network consists of a first resistor connected between the filter and a node, a second resistor connected between the node and ground, and a third resistor connected between the node and the control of the active switch.

9. The UWB radio transmission module of claim 5, wherein the UWB signal generation circuit comprises an active switch including a control connected to the resistor network.

10. The UWB radio transmission module of claim 9, wherein the active switch includes an emitter connected to ground and a collector connected to the antenna component.

11. The UWB radio transmission module of claim 10, wherein the resistor network consists of a first resistor connected between the filter and a node, a second resistor connected between the node and ground, and a third resistor connected between the node and the control of the active switch.

12. The UWB radio transmission module of claim 9, wherein the active switch is connected between an antenna and ground.

13. The UWB radio transmission module of claim 5, wherein the resistor network consists of a first resistor connected between the filter and a node, a second resistor connected between the node and ground, and a third resistor connected between the node and a control of an active switch.

14. The UWB radio transmission module of claim 13, wherein the active switch is connected between an antenna and ground.

15. The UWB radio transmission module of claim 14, wherein the filter is connected between the first resistor and an input to the antenna.

16. The UWB radio transmission module of claim 15, wherein the filter includes an inductor to filter VHF.

17. The UWB radio transmission module of claim 2, wherein the quadrangular microstrip resonator antenna outputs a signal detecting an intrusion into a protection area.

18. The UWB radio transmission module of claim 1, wherein the microstrip resonance antenna component outputs a signal detecting an intrusion into a protection area.

* * * * *